United States Patent
Dabral et al.

(10) Patent No.: US 10,497,046 B2
(45) Date of Patent: Dec. 3, 2019

(54) CONTEXTUAL ECOMMERCE SHOPPING CART ADJUSTMENT

(71) Applicant: Button Inc., New York, NY (US)

(72) Inventors: Siddhartha Dabral, New York, NY (US); Christopher James Maddern, New York, NY (US); Michael Edward Jaconi, New York, NY (US)

(73) Assignee: Button, Inc., New York, NY (US)

( * ) Notice: Subject to any disclaimer, the term of this patent is extended or adjusted under 35 U.S.C. 154(b) by 391 days.

(21) Appl. No.: 14/538,668

(22) Filed: Nov. 11, 2014

(65) Prior Publication Data

US 2016/0132955 A1 May 12, 2016

(51) Int. Cl.
*G06Q 30/00* (2012.01)
*G06Q 30/06* (2012.01)
*G06Q 30/02* (2012.01)
*G05B 19/418* (2006.01)

(52) U.S. Cl.
CPC ..... *G06Q 30/0633* (2013.01); *G06Q 30/0226* (2013.01)

(58) Field of Classification Search
CPC .............. G06Q 30/0633; G06Q 30/0226
See application file for complete search history.

(56) References Cited

U.S. PATENT DOCUMENTS

| 5,557,088 A | 9/1996 | Shimizu et al. |
| 2002/0111873 A1 | 8/2002 | Ehrlich et al. |
| 2005/0086103 A1 | 4/2005 | Agura et al. |
| 2008/0104255 A1 * | 5/2008 | Volodarsky ............ H04L 67/14 709/228 |
| 2012/0150604 A1 | 6/2012 | Bennett et al. |
| 2013/0060682 A1 | 3/2013 | Nezu et al. |

(Continued)

FOREIGN PATENT DOCUMENTS

| EP | 2838060 A1 * | 2/2015 | ............ G06Q 20/02 |
| JP | 2012063970 A | 3/2012 | |
| WO | 2011148873 A1 | 12/2011 | |

OTHER PUBLICATIONS

Personalized DeepLinks in Search Engine Results Page. IP.com Prior Art Database. Prabu Dhakshinamurthy. IPCOM000209042D. Jul. 25, 2011. (Year: 2011).*

(Continued)

*Primary Examiner* — Maria V Vanderhorst
(74) *Attorney, Agent, or Firm* — Lerner, David, Littenberg, Krumholz & Mentlik, LLP

(57) ABSTRACT

The present disclosure describes methods, systems, and computer program products for providing contextual ecommerce shopping cart adjustments. One computer-implemented method includes receiving, from a partner application, a cart adjustment request. Zero or more available adjustments applicable to a cart of a user using the partner application for checkout are sent to the partner application. An execution request is received from a partner service server to execute an activated adjustment and a cart adjustment token identifying the activated adjustment to the cart of the user and a payment adjustment determined based on the activated adjustment to the cart of the user is sent to the partner service server. A finalization request for finalizing the activated adjustment is received from the partner service server and the activated adjustment to the cart of the user is finalized.

20 Claims, 9 Drawing Sheets

(56) References Cited

U.S. PATENT DOCUMENTS

2013/0268346 A1* 10/2013 Walker .............. G06Q 30/0207
705/14.37
2014/0122203 A1  5/2014 Johnson et al.

OTHER PUBLICATIONS

Robot-Supported Cooperative Work: A Shared-Shopping Scenario. 2011. (Year: 2011).*
How to Shop for Free Online—Security Analysis of Cashier-as-a-Service Based Web Stores. 2011 (Year: 2011).*
PCT International Search Report and Written Opinion of the International Searching Authority, PCT/US2015/060150, dated Jan. 22, 2016, 7 pages.
PCT International Preliminary Report on Patentability, PCT/US2015/060150, dated May 26, 2017, 6 pages.
European Patent Office, Extended European Search Report, European Application No. 15859230.3, dated Apr. 5, 2018, 9 pages.

* cited by examiner

CONTEXTUAL ECOMMERCE SHOPPING CART ADJUSTMENT

BACKGROUND

Ecommerce vendors provide platforms that enable purchasing and trading products or services using communication networks, such as the Internet. A recent trend for ecommerce vendors is to provide mobile commerce that allows customers to purchase products and/or reserve services using mobile devices such as smart phones and tablets. Typically, a customer/user can download and install a mobile application of an ecommerce vendor and conduct online shopping using the mobile application. For instance, a customer can use the mobile application to review product/service information, compare and select products/services, place selected items into a shopping cart/wish list, checkout and make payments, track order status, manage user account, or enjoy other shopping experiences.

SUMMARY

The present disclosure relates to computer-implemented methods, computer-readable media, and computer systems for providing ecommerce shopping cart adjustments. In an implementation, zero or more available adjustments applicable to a cart of a user using the partner application for checkout are sent to the partner application. An execution request is received from a partner service server to execute an activated adjustment and a cart adjustment token identifying the activated adjustment to the cart of the user and a payment adjustment determined based on the activated adjustment to the cart of the user is sent to the partner service server. A finalization request for finalizing the activated adjustment is received from the partner service server and the activated adjustment to the cart of the user is finalized.

One computer-implemented method includes receiving, from a partner application, a cart adjustment request; sending, to the partner application, zero or more available adjustments applicable to a cart of a user using the partner application for checkout; receiving, from a partner service server, an execution request to execute an activated adjustment; sending, to the partner service server, a cart adjustment token identifying the activated adjustment to the cart of the user and a payment adjustment determined based on the activated adjustment to the cart of the user; receiving, from the partner service server, a finalization request for finalizing the activated adjustment; and finalizing the activated adjustment to the cart of the user.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, comprising determining whether one or more services are applicable to the cart of the user and determining whether one or more adjustments are available based on the one or more services.

A second aspect, combinable with any of the previous aspects, wherein determining the one or more available adjustments based on the one or more services comprises determining whether the user has a credit applicable to the cart or the user is enrolled in a loyalty service that is to be affected by the cart.

A third aspect, combinable with any of the previous aspects, further comprising receiving, from the partner application, the activated adjustment and sending, to the partner application, a cart state after applying the activated adjustment.

A fourth aspect, combinable with any of the previous aspects, further comprising, in response to receiving, from a partner service server, an execution request to execute an activated adjustment, determining the payment adjustment based on the activated adjustment to the cart of the user, and determining whether the cart triggers an action that affects a stored value of the user.

A fifth aspect, combinable with any of the previous aspects, wherein finalizing the activated adjustment to the cart of the user comprises updating account information of the user based on the execution of the activated adjustment to the cart of the user, and sending, to the partner service server, a confirmation indicating a success or failure of the execution of the activated adjustment to the cart of the user.

A sixth aspect, combinable with any of the previous aspects, wherein updating account information of the user based on the execution of the activated adjustment to the cart of the user comprises determining a transfer associated with the cart adjustment token and updating a stored value of the user based on the transfer.

The subject matter described in this specification can be implemented in particular implementations so as to realize one or more of the following advantages. First, the example cart adjustment techniques can provide seamlessly and securely contextual promotional deals to consumers of ecommerce vendors that partner with the cart adjustment system, providing enumerated potential cart adjustments with integrated user experience elements and providing application consumers the option of which adjustment is best for them. Second, the example cart adjustment techniques can reduce or remove the dependence of fraud-laden coupon code acquisition campaigns. Third, the example cart adjustment techniques can create stored values for consumers. The stored value can be converted and applied to a charge of a shopping cart. The example cart adjustment techniques can provide adjustments to the cart in real time during the checkout process and hold the stored value corresponding to the consumer's selected cart adjustment. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
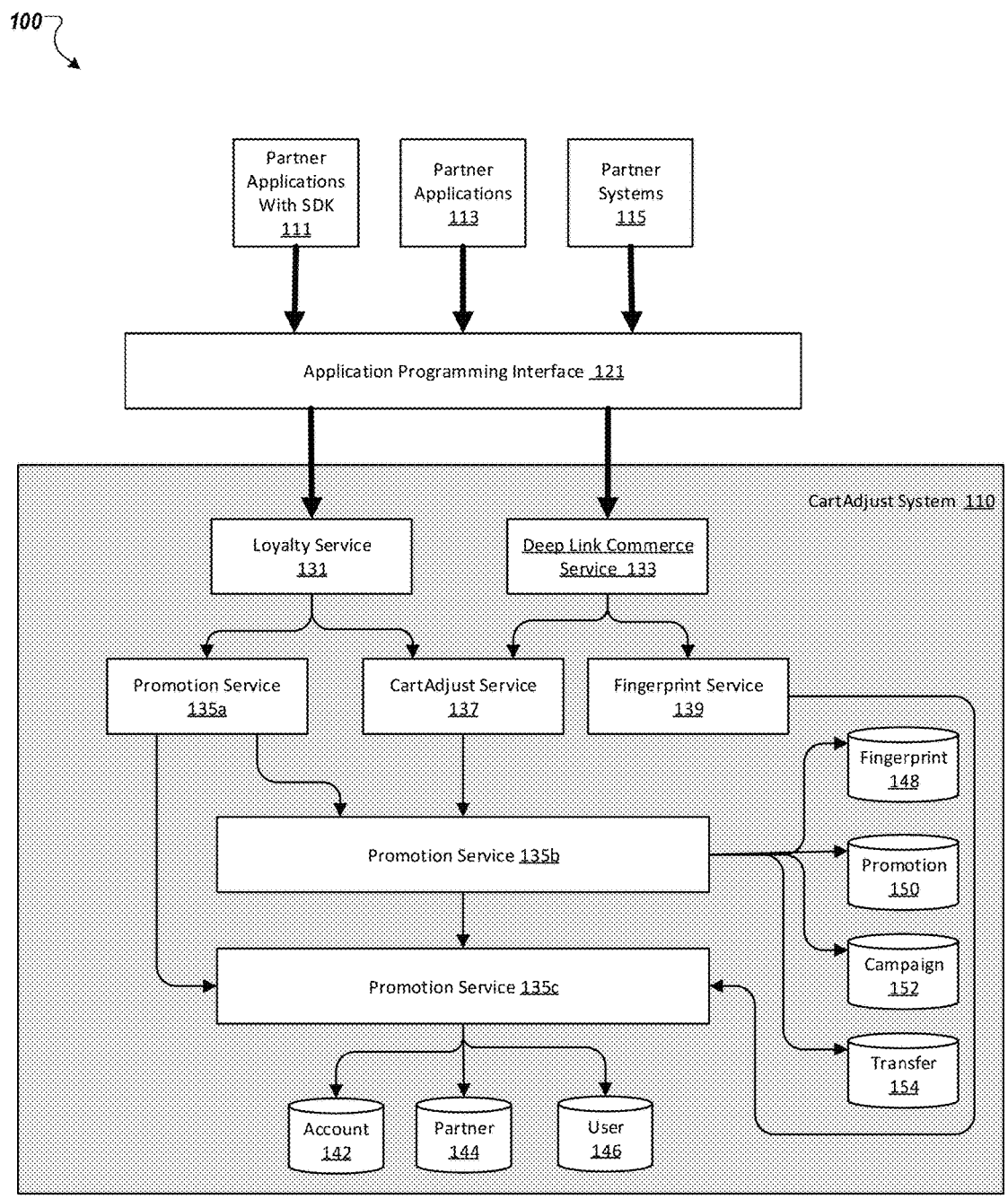
FIG. 1A is a high-level architecture block diagram illustrating an example distributed computing system (EDCS) for providing cart adjustment functionality according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

The present disclosure describes techniques for providing cart adjustments to a user or consumer's shopping cart when the user checks out using an ecommerce application. The example cart adjustment techniques can be implemented by a cart adjustment system that partners with one or more ecommerce vendors (e.g., retailers, service providers, or marketplace operators that provide online shopping experience to customers). The ecommerce vendors can provide their customers with client applications such as mobile applications, web applications, or other applications executable on a mobile phone, tablet, laptop, desktop, or other computing devices.

When a customer uses the application of the ecommerce vendors (referred to as a partner application) for checkout, the cart adjustment system can offer the consumer an enumeration of personalized cart adjustment options. These cart adjustments can include, for example, convertible monetary value (e.g., credits, promotions, loyalty points, etc.) that may affect the total cost of a shopping cart or transaction. The convertible monetary value can be determined, for example, based on consumer data (e.g., demographic data, purchase history, etc.) and stored value data managed within a data storage (e.g., one or more databases) of the cart adjustment system. A stored value account can be created for each user who enrolls in the cart adjustment service. In some implementations, enrollment in the cart adjustment service, including creating stored values, can be controlled by the partner ecommerce vendors. For example, a partner can choose to support the cart adjustment services for all, some, or any subset of their users. In some implementations, the cart adjustment system itself or other systems can enroll and provide cart adjustment services to users outside of the scope of the ecommerce partners (e.g., the users of the cart adjustment system itself). The stored value can include, for example, loyalty points, credits, mileages, or other types of values. In some implementations, a user can have multiple stored values for multiple different services and/or different ecommerce vendors. The multiple stored values can be in the same or different currency. The cart adjustment system can determine the convertible monetary value, for example, by converting the stored values into the currency used (e.g., in a shopping cart) by the company where the transaction is being made, and apply the convertible monetary value to the shopping cart. As an example, the convertible monetary value can include a loyalty redemption determined based on a loyalty service (e.g., "spend 5,000 points, and take $5 off this purchase"), a cross application promotion determined based on a deep link commerce service (e.g., when a user is directed from Application 1 to Application 2, in the checkout screen of Application 2, a cart adjustment option such as "Thanks for checking out at Application 2, claim $5 off this purchase for downloading us from Application 1" can be prompted), or other types of monetary values. The cart adjustment options can be presented to the consumer within the partner application, for example, using a user interface (UI).

Upon the selection of a cart adjustment option (e.g., chosen by the consumer's interaction with the UI), the cart adjustment system can automate the redemption of the monetary amount associated with the cart adjustment option. The verified and secure monetary amount can be passed to the partner application indicating the charge adjustment to the application's payment processor (e.g., credit card processor), and thus completing the selected redemption cart adjustment.

In some implementations, the cart adjustment techniques described herein can allow the partner ecommerce vendors to offer and execute real-time cart adjustments to their commerce application's cart at the time of a user's checkout. The cart adjustment can be arbitrary and customized, for example, based on the user's demographic information, preferences, behavior (e.g., shopping history), or other contextual information collected by the cart adjustment system. In some implementations, all data associated with a transfer of application experience, promotional context, and user behaviors (e.g., at multiple partner applications) can be stored within the databases of the cart adjustment system, thus providing an in-depth repository useful for providing greater intelligence for serving users of the partner applications, which in turn increases the likelihood of usage within their consumer base. In some implementations, the cart adjustment system can facilitate the multiple ecommerce partners expanding their revenue streams with minimal vendor integration by providing cross application promotional capabilities to attract customers. In some implementations, the cart adjustment techniques can help reduce or remove the dependence of fraud-laden coupon code acquisition campaigns. Additional or different advantages can be achieved.

FIG. 1A is a high-level architecture block diagram illustrating an example distributed computing system (EDCS) 100 for providing cart adjustment functionality according to an implementation. At a high level, the illustrated EDCS 100 includes or is made up of one or more communicably coupled computers (refer to FIG. 1B) that communicate using an application programming interface (API) 121. Although not explicitly illustrated in FIG. 1, the components of the EDCS 100 can communicate across one or more networks (refer to FIG. 1B). In some implementations, the API 121 or one or more of the other connections between components can also be considered part of a network. In some implementations, the EDCS 100 or portions of the EDCS 100 can operate within a cloud-computing-based environment. The illustrated EDCS 100 includes a cart adjustment system (or CartAdjust system) 110, an API 121, and one or more partner applications with SDK 111, partner applications 113, and partner systems 115. The described illustration is only one possible implementation of the described subject matter and is not intended to limit the disclosure to the single described implementation. Those of ordinary skill will appreciate the fact that the described components can be connected, combined, and used in alternative ways consistent with this disclosure.

The cart adjustment system 110 is any device or program for providing shopping cart adjustment functionalities. For example, the cart adjustment system 110 can be implemented as a server or a client and can reside or be coupled with any kind of computing device or system. In some implementations, the cart adjustment system 110, as a third party, is communicably coupled with multiple partner applications with SDK 111, partner applications 113, and partner systems 115, through the API 121. The cart adjustment system 110 can integrate, oversee, and manage cart adjustment functionalities across multiple partner applications with SDK 111, partner systems 115, and partner applications 113. In some instances, the cart adjustment system 110 can be implemented in a dedicated system in a centralized manner or be distributed among multiple servers or clients in a network.

The cart adjustment system 110 can provide various software ecommerce services associated with shopping cart adjustments. For example, the cart adjustment system 110 can include loyalty service 131, deep link commerce service 133, promotion services 135 *a-c*, cart adjustment service 137, and fingerprint service 139. The cart adjustment system 110 can provide additional or different services. In some implementations, the services can be implemented as one or more modules or applications, executed by one or more processors or subsystems of the cart adjustment system 102.

The loyalty service 131 can include services that manage point accruals and redemptions for purchases made within one or more partner applications 113. The service manages a consumer's point balance that includes their point earnings (e.g., based on transaction details within a partner application 113) and their point redemptions, which can discount their carts at the time of checkout according to the cart adjustment techniques.

The deep link commerce service 133 can include services that manage the persistence of user context during the flow of users from one application to another application. The application can include, for example, mobile application, web application, email, webpage, or any other software module or engine providing functionality or service according to particular needs, desires, or particular implementations. Using the fingerprinting service 139, the deep link commerce service 133 can identify a user within an application. The service then provides user information, contextual content, and contextual cart debits/credits (in any currency, including points) at checkout, which can be used for providing cart adjustments. For example, the deep link commerce service 133 can provide the cross application promotion described above including "email to app" and "web to app" promotions. As an example, a promotion such as "We noticed you like our app! Check out this other Service C for a $5 credit on your first purchase with Service C" can be in provided in a web, email, or other communication format and direct the user to Service C. The promotion can be used as a cart adjustment for the user when the user checks out with Service C.

The promotion services 135*a-c* can include services that manage campaigns and promotion enumerations presented to a user within an application. This can be loyalty promotions on specific items in a partner application's product catalog, or real-time cart discounts at the time of checkout (e.g., based on inputs provided), which can be executed according to the cart adjustment techniques.

The CartAdjust service 137 can include services that manage shopping carts of consumers of one or more partner applications. The CartAdjust service 137 can embody the example cart adjustment techniques described in this disclosure that include, for example, generating and enumerating a list of cart adjustment options, executing a selected cart adjustment option, and finalizing the cart adjustment option (e.g., confirming or reporting execution of the cart adjustment and updating user information within the database). The CartAdjust service 137 can also interact with other services provided by the cart adjustment system 110, for example, in determining what cart adjustments are available and how much monetary value reduction is for each of the cart adjustments.

The fingerprint service 139 can include services that identify a user within a partner application using various metadata collected and passed to it (e.g., device identifier, user account information, IP address, etc.). In some instances, once the user is identified, the system can pull user information from, for example, a user account system to provide proper user context to any consuming service or system.

The cart adjustment system 110 can include memory, database, and/or data management system for generating, storing, updating, or otherwise managing data associated with the various services for providing cart adjustment functionalities. The data can include, for example, account data 142 that can include user account information (e.g., email, phone number, payment information (e.g., credit card information) and account balances (e.g., in both points and currencies like USD)), partner data 144 (e.g., name, size, commerce/consuming service type, partner application data, etc.), user data 146 that can include generic user data (e.g., name, address, age, sex, or other user information) and partner-specific user data (e.g., identifiers used within a partner application), fingerprint data 148 (e.g., device identifier, user identifier, user credential, encrypted data, etc.), promotion data 150 (e.g., partner-specific promotion, user-specific promotion, loyalty account information, store credit information, coupon information, etc.), campaign data 152, transfer data 154 (e.g., payment information, credit/debit information, etc.), and other data. In some implementations, these types of information can be classified and managed in a different manner than that is shown in FIG. 1A.

In some implementations, the cart adjustment system 110 can include a bank system (not shown) that manages all the financial responsibilities that cart adjustment system 110 takes on. This can include any credits and/or debits issued to user accounts in any currency, including points. For example, when a user earns 500 points from a purchase, the earned points are generated and managed by the bank system as a financial ledger. Similarly, when a user executes a $5 credit according to the cart adjustment techniques at the time of checkout in a partner application, that liability value is stored and managed within the bank system of the cart adjustment system 110.

The API 121 can include specifications for routines, data structures, object classes, and variables that define interfaces for accessing, communicating, and interacting with the cart adjustment system 110. The API 121 can support the discovery and execution of the services (e.g., loyalty service 131, deep link commerce service 133, promotion services 135 *a-c*, cart adjustment service 137, fingerprint service 139, etc.) provided by the cart adjustment system 110. In some implementations, the API 121 can be an API management system that includes multiple APIs (e.g., dedicated for different services or different partners), API endpoints to which a consumer of an API (e.g., partner applications with SDK 111, partner applications 113, and partner systems 115) connects to, and/or other API administration components. Although illustrated as a separated component of EDCS 100 in FIG. 1, the API 121 can be implemented as an integral component (e.g., as a plug-in or a locally defined interface) of the cart adjustment system 100, the partner applications with SDK 111, partner applications 113, or partner systems 115.

The partner application with SDK 111 can include a set of software development tools or platforms that allows the creation of partner applications that interface the API 121 and can interact with the cart adjustment system 110 for providing cart adjustment functionalities for the partner applications.

The partner application 113 can include one or more mobile applications, web applications, or other algorithmic software engine for providing an online shopping experience to customers of an ecommerce vendor that partners with the cart adjustment system 110. The partner application 113 can be accessed and manipulated by a user using, for example, a mobile device, to place orders, make reservations, manage user account, update payment information, or perform any other operations related to products or services provided by the ecommerce vendor.

The partner system 115 can include a computing system of an ecommerce vendor for providing ecommerce services (also referred to as partner services) to customers. In some implementations, the partner system 115 can represent a server side of the ecommerce vendor that oversees and manages a number of applications distributed for use of its customers. In some implementations, the partner system 115 is communicably linked (e.g., through direct connection or a communication network) to one or more payment vendors (e.g., credit card companies, banks, payment services, or other financial institutions) for executing payments of transactions.

Figure 1B:
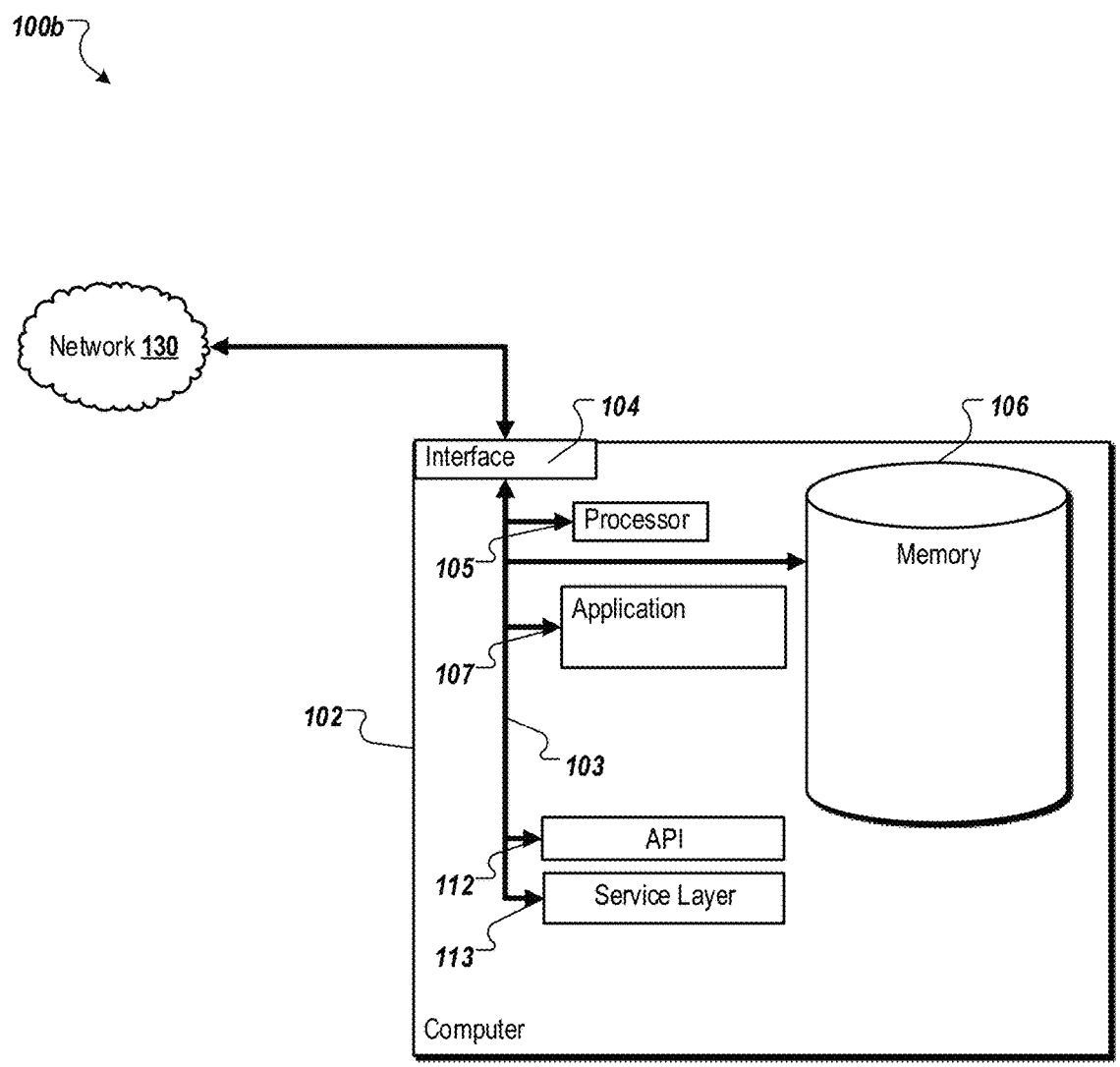
FIG. 1B is an example block diagram of an exemplary computer used in the EDCS of FIG. 1A according to an implementation

FIG. 1B is a block diagram 100*b* of an exemplary computer 102 used in the EDCS 100 according to an implementation. The illustrated computer 102 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 102 may comprise a computer that includes an input device, such as a keypad, keyboard, touch screen, or other device that can accept user information, and an output device that conveys information associated with the operation of the computer 102, including digital data, visual and/or audio information, or a GUI.

In general, the computer 102 can serve as a server, a client, a network component, a database, or other persistency of a computing system. In some implementations, the computer 102 can serve as the cart adjustment system 110, the partner system 115, the API 121, the partner application with SDK 111, the partner application 113, and/or any other component of the EDCS 100. The illustrated computer 102 is communicably coupled with a network 130. In some implementations, one or more components of the computer 102 may be configured to operate within a cloud-computing-based environment.

At a high level, the computer 102 is an electronic computing device operable to receive, transmit, process, store, or manage data and information associated with the EDCS 100. According to some implementations, the computer 102 may also include or be communicably coupled with an application server, e-mail server, web server, caching server, streaming data server, business intelligence (BI) server, and/or other server.

The computer 102 can receive requests over network 130 from a client application (e.g., executing on another computer 102) and respond to the received requests by processing the said requests in an appropriate software application. In addition, requests may also be sent to the computer 102 from internal users (e.g., from a command console or by other appropriate access method), external or third parties, other automated applications, as well as any other appropriate entities, individuals, systems, or computers.

Each of the components of the computer 102 can communicate using a system bus 103. In some implementations, any and/or all the components of the computer 102, both hardware and/or software, may interface with each other and/or the interface 104 over the system bus 103 using an application programming interface (API) 112 and/or a service layer 113. In some implementations, the API 112 can be the API 121 in FIG. 1A; the service layer 113 can provide the functionalities of one or more services (e.g., loyalty service 131, deep link commerce service 133, promotion services 135*a-c*, cart adjustment service 137, and fingerprint service 139) in FIG. 1A. The API 112 may include specifications for routines, data structures, and object classes. The API 112 may be either computer language-independent or -dependent and refer to a complete interface, a single function, or even a set of APIs. The service layer 113 provides software services to the computer 102 and/or the EDCS 100. The functionality of the computer 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format. While illustrated as an integrated component of the computer 102, alternative implementations may illustrate the API 112 and/or the service layer 113 as stand-alone components in relation to other components of the computer 102 and/or EDCS 100. Moreover, any or all parts of the API 112 and/or the service layer 113 may be implemented as child or sub-modules of another software module, enterprise application, or hardware module without departing from the scope of this disclosure.

The computer 102 includes an interface 104. Although illustrated as a single interface 104 in FIG. 1B, two or more interfaces 104 may be used according to particular needs, desires, or particular implementations of the computer 102 and/or EDCS 100. The interface 104 is used by the computer 102 for communicating with other systems in a distributed environment—including within the EDCS 100—connected to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The computer 102 includes a processor 105. Although illustrated as a single processor 105 in FIG. 1B, two or more processors may be used according to particular needs, desires, or particular implementations of the computer 102 and/or the EDCS 100. Generally, the processor 105 executes instructions and manipulates data to perform the operations of the computer 102. Specifically, the processor 105 executes the functionality required for providing cart adjustment.

The computer 102 also includes a memory 106 that holds data for the computer 102 and/or other components of the EDCS 100. Although illustrated as a single memory 106 in FIG. 1B, two or more memories may be used according to particular needs, desires, or particular implementations of the computer 102 and/or the EDCS 100. While memory 106 is illustrated as an integral component of the computer 102, in alternative implementations, memory 106 can be external to the computer 102 and/or the EDCS 100.

The application 107 is an algorithmic software engine providing functionality according to particular needs, desires, or particular implementations of the computer 102 and/or the EDCS 100, particularly with respect to functionality required for providing shopping cart adjustments. For example, application 107 can serve as one or more components/applications described in FIG. 1A (e.g., the partner application with SDK 111, the partner application 113, the cart adjustment system 110, and the partner systems 115). Further, although illustrated as a single application 107, the application 107 may be implemented as multiple applications 107 on the computer 102. In addition, although illustrated as integral to the computer 102, in alternative implementations, the application 107 can be external to the computer 102 and/or the EDCS 100.

There may be any number of computers 102 associated with, or external to, the EDCS 100 and communicating over network 130. Further, the term "client," "user," and other appropriate terminology may be used interchangeably as appropriate without departing from the scope of this disclosure. Moreover, this disclosure contemplates that many users may use one computer 102, or that one user may use multiple computers 102.

Figure 2:
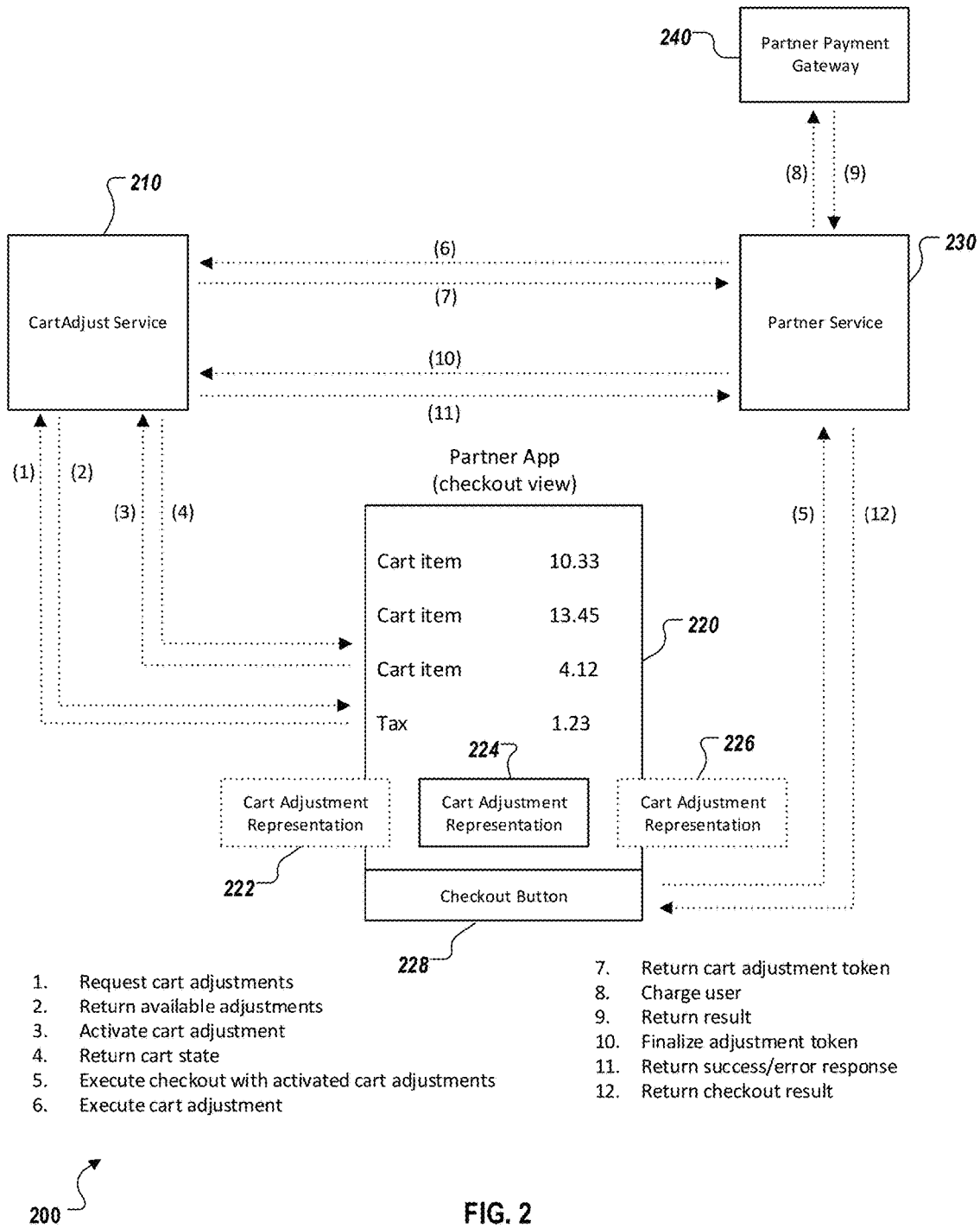
FIG. 2 is an architectural block diagram illustrating a cart adjustment system flow according to an implementation.

FIG. 2 is an architectural block diagram illustrating a flow (method 200) of an example system 202 for providing cart adjustments according to an implementation. For clarity of presentation, the description that follows generally describes method 200 in the context of FIGS. 1A-1B and 3-8. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

The example system 202 can be implemented by the illustrated EDCS 100 or another computer system. At a high level, the example system 202 includes a CartAdjust service 210, a partner application (checkout view) 220, a partner service 230, and a partner payment gateway 240. The example system 202 can include additional or different services, modules, and/or platforms.

The CartAdjust service 210 can provide cart adjustment services when a user is checking out using a partner application. In some implementations, the CartAdjust service 210 can include the example CartAdjust service 137 of FIG. 1A or another type of the cart adjustment service. The CartAdjust service 210 can be implemented by the CartAdjust system 110 of FIG. 1 or another cart adjustment system.

The partner application (checkout view) 220 is an example representation of a partner's client application (e.g., the partner application 113 of FIG. 1A). As illustrated, the partner application (checkout view) 220 shows an example cart checkout view (e.g., the final stage in the commerce flow) of a partner application. The checkout view 220 can be, for example, displayed using a graphic user interface (GUI) on a screen (e.g., a touch screen) of a user's mobile device. The checkout view 220 can generally present the total charge that the user should expect (assuming completed checkout). In some implementations, the checkout view 220 can include one or more user interface (UI) components that represent available cart adjustment options 222, 224, and 226. The user can select one or more available cart adjustment options and proceed with checkout, for example, by activating the checkout button 228.

The partner payment gateway 240 can include one or more payment vendors that the associated partner is using to execute payments of the consumers. In some implementations, the partner payment gateway 240 can be integrated using exposed payment vendor APIs such as those by BRAINTREE, STRIPE, and/or other payment vendors.

The partner service 230 can represent the server side system of the partner that the client side application (e.g., the partner application 113 of FIG. 1A) communicates with (e.g., the partner system 115 of FIG. 1A). The partner service 230 can enable user management for their client applications, payment integration with the payment gateway vendor, and any data management (databases) required for functionality of the client applications.

At (1), a cart adjustment request is received by the CartAdjust service 210 from the partner application 220. The cart adjustment request can be triggered automatically (e.g., when the user enters the checkout view) or based on a user's request. For example, the partner application 220 may include a graphic, contextual, or another type of prompt (e.g., in the form of a pop-up window) notifying a user of possible available cart adjustment options. The cart adjustment request can be triggered when the user clicks, selects, or otherwise activates the prompt. From (1), method 200 proceeds to (2).

At (2), the CartAdjust service 210 can identify cart adjustment options available to the cart of the particular user. Example techniques for generating and identifying available cart adjustment options are described in greater detail below with respect to FIG. 4. If there is no cart adjustment available, the CartAdjust service 210 can send such an indication to the partner application 220. The partner application can convey such indication to the user, so that the user can proceed with the checkout with no cart adjustment UI elements shown. If there are one or more available adjustments applicable to the cart of the user, the CartAdjust service 210 can send the one or more cart adjustments to the partner application 220. In some implementations, upon receipt of the available adjustments, the partner application 220 can present the cart adjustments to the user, for example, as the example cart adjustment representations 222, 224, and 226 shown in FIG. 2. From (2), method 200 proceeds to (3).

At (3), the partner application 220 can send an activated cart adjustment to the CartAdjust service 210. The activated cart adjustment can be based on user's selections, for example, upon a user's active interaction with the UI element of the partner application 220. In some implementations, the activated cart adjustment can be automatically selected or determined, for example, when a specific product/service is included in the cart. From (3), method 200 proceeds to (4).

At (4), upon receipt of the activated cart adjustment, the CartAdjust service 210 can evaluate and apply the activated cart adjustment to the cart, obtaining an updated cart state (e.g., a total charge to be expected if the activated cart adjustment is applied). The partner application 220 can refresh the checkout view to show the updated total charge to provide the user a preview of the total charge of the cart if the activated cart adjustment is applied. If the user chooses to proceed to checkout with the activated cart adjustment, method 200 proceeds from (4) to (5). If the user chooses not to proceed with the activated cart adjustment, the partner application 220 can provide functionality to return to the previous checkout view. In some implementations, if there are additional cart adjustments available, the user can activate another cart adjustment, and (3) and (4) can be repeated until no more cart adjustment is available or until the user decides to checkout with the currently applied cart adjustment.

At (5), the partner application 220 can execute checkout with the activated cart adjustment by sending a checkout request to the partner service 230. In some implementations, the checkout request can include an indication of an activated cart adjustment that the user selected to apply to the cart. From (5), method 200 proceeds to (6).

At (6), the partner service 230 can interact with the CartAdjust service 210 to execute the activated cart adjustment that has been selected. During the execution process, the CartAdjust service 210 can apply the activated cart adjustment, for example, by applying credits or other available stored values of the user to deduct the payment, determining the payment adjustment and/or updated cart charge, determining the stored value of the user given the cart adjustment being applied, etc. Example techniques for executing the cart adjustment are described in greater detail below with respect to FIG. 7. From (6), method 200 proceeds to (7).

At (7), the CartAdjust service 210 can return a cart adjustment token to the partner service 230. In some implementations, the cart adjustment token can serve as a receipt to identify the activated cart adjustment has been selected and executed for checkout purpose. In some implementations, a payment adjustment determined by the CartAdjust service 210 at (6) can be sent to the partner service 230 together with or as a part of the cart adjustment token. From (7), method 200 proceeds to (8).

At (8), the partner service 230 can contact the partner payment gateway 240, for example, to charge the user based on the updated total charge after applying the activated cart adjustment. From (8), method 200 proceeds to (9).

At (9), the partner payment gateway 240 returns the payment result to the partner service 230. If the payment is not successful, the partner service 230 can return an error message to the partner application 220; the latter can present the error and/or the cause of the error to the user, and/or the cart adjustment action can be cancelled or reverted. In this case, method 200 stops. If the payment is successful, the method 200 proceeds from (9) to (10).

At (10), the partner service 230 can send, for example, a finalization request to the CartAdjust service 210 for finalizing the cart adjustment. In some implementations, the finalization request can include a payment confirmation indicating the payment was successfully made. As such, the partner authorizes the CartAdjust service 210 to finalize the stored value of the user according to the execution of the activated cart adjustment. In some implementations, the finalization request can include a cart adjustment token identifying the cart adjustment that is requested to be finalized. The CartAdjust service 210 can finalize the cart adjustment, for example, by updating account information, the stored value information, or other information of the user based on the execution of the activated adjustment to the cart of the user. As an example, the CartAdjust service 210 can deduct useable credits or coupons of the user from the user account, increase the loyalty points of the user based on the amount of money paid during this transaction, etc. After finalization, the stored user value of the user is no longer considered pending but finalized. The CartAdjust service 210 can then send to the partner service server 230 a finalization response indicating a success or failure of the execution of the activated adjustment to the cart of the user. In some implementations, the CartAdjust service 210 and the partner service 230 can communicate through a secured or trusted channel, and the payment adjustment or other information can be escrowed over time. As such, in some implementations, a token is not required for communication between the CartAdjust server 210 and the partner service 230. Example techniques for finalizing the cart adjustment are described in greater detail below with respect to FIG. 8. From (10), method 200 proceeds to (11).

At (11), the CartAdjust service 210 can send, to the partner service 230, a success or error response indicating whether the finalization of the cart adjustment is successful. From (11), method 200 proceeds to (12).

At (12), the partner service 230 can return the checkout result to the partner application 220 based on the success or error response received from the CartAdjust service 210. The partner application 220 can then present the checkout result to the user. After (12), method 200 stops.

Figure 3:
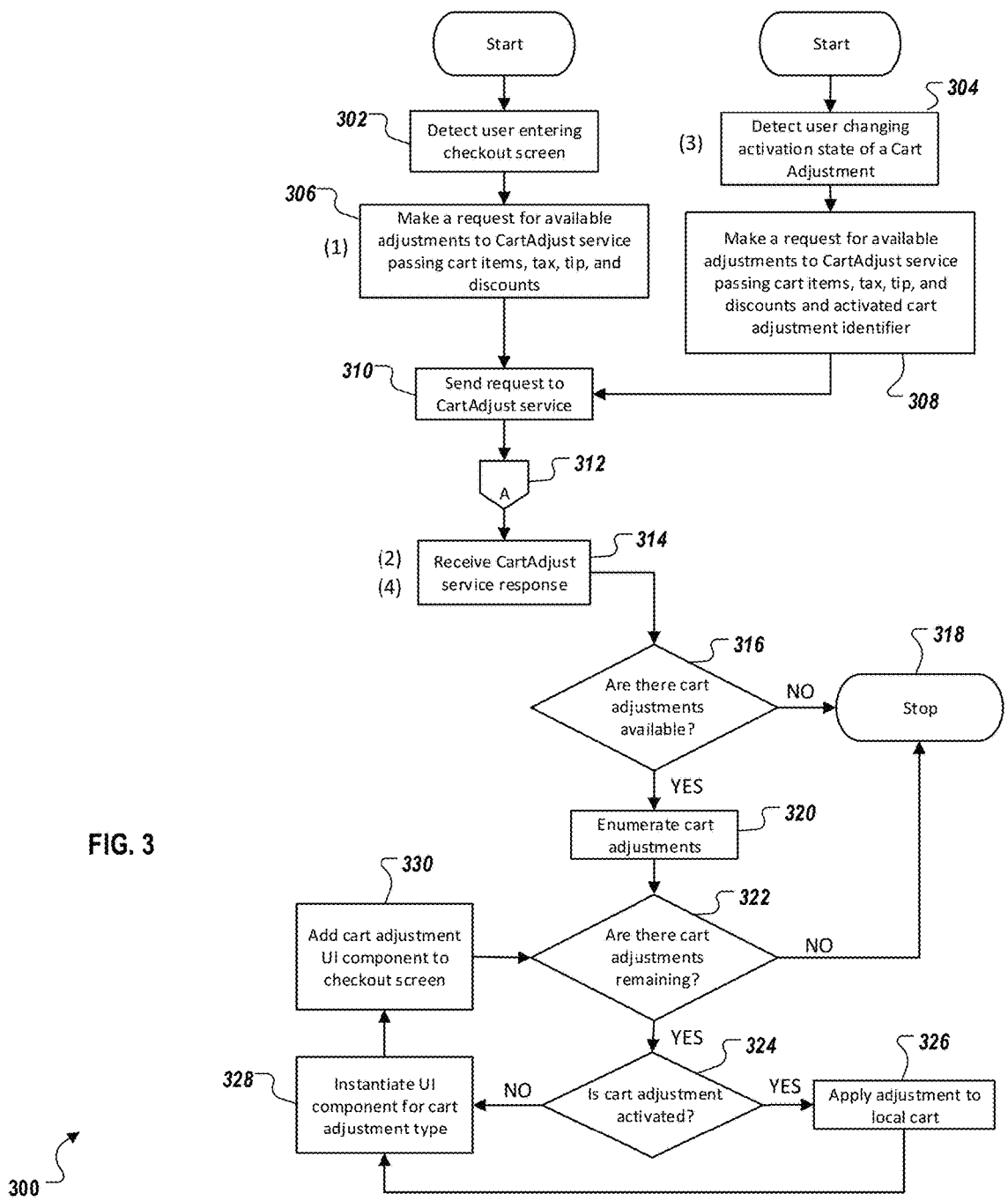
FIG. 3 is a flow chart of a method illustrating a partner application checkout view according to an implementation.

FIG. 3 is a flow chart of a method 300 illustrating a partner application checkout process according to an implementation. For clarity of presentation, the description that follows generally describes method 300 in the context of FIGS. 1A, 1B, 2, and 4-8. For example, some or all of the example method can be performed by the partner application 220 of FIG. 2. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order.

In some instances, method 300 begins with 302, where a user entering a checkout screen (e.g., the example checkout view 220 of FIG. 2) is detected, for example, by the partner application receiving a user input. From 302, method 300 proceeds to 306.

At 306, a request is made for available adjustments to a CartAdjust service (e.g., the CartAdjust service 210 of FIG. 2) automatically or per user's instruction. Information associated with a shopping cart such as cart items, tax, tip, and discounts can be passed to the CartAdjust service. In some instances, 306 can correspond to (1) of method 200 of FIG. 2. From 306, method 300 proceeds to 310.

In some instances, method 300 begins with 304, where a user selecting or otherwise activating a cart adjustment (e.g., a cart adjustment already displayed on the checkout view of the partner application) can be detected. In some implementations, each of the cart adjustments can have an identifier identifying, for example, whether the adjustment is activated or not. Once a cart adjustment is activated, the identifier of the cart adjustment can be changed to indicate that the cart adjustment is in an activated state. In some instances, 304 can correspond to (3) of method 200 of FIG. 2. From 304, method 300 proceeds to 308.

At 308, a request is made for available adjustments to a CartAdjust service (e.g., the CartAdjust service 210 of FIG. 2) automatically or per user's instruction. Information associated with a shopping cart including, for example, cart items, tax, tip, and discounts and the identifier of the activated cart adjustment can be passed to the CartAdjust service. From 306, method 300 proceeds to 310.

At 310, the checkout request is sent to the CartAdjust service. From 310, method 300 proceeds to 312.

At 312, a set of available cart adjustments can be identified. Example techniques for identifying the available cart adjustments are described in greater detail below with respect to FIG. 4. From 312, method 300 proceeds to 314.

At 314, a response is received from the CartAdjust service. The response can include the set of available cart adjustments and/or the cart state given the activated cart adjustment is applied. In some instances, 314 can correspond to (2) and (4) of method 200 of FIG. 2. From 314, method 300 proceeds to 316.

At 316, a determination is made whether any cart adjustments are available. If a cart adjustment is not available, method 300 proceeds from 316 to 318 where method 300 stops. If a cart adjustment is available, method 300 proceeds from 316 to 320.

At 320, all available cart adjustments can be iterated or otherwise enumerated. From 320, method 300 proceeds to 322.

At 322, whether there is any cart adjustment remaining (i.e., has not been evaluated) is determined. If the determination is no, method 300 proceeds from 322 to 318 where method 300 stops. If, however, there is a cart adjustment remaining, method 300 proceeds from 322 to 324.

At 324, whether the remaining cart adjustment is activated or not can be determined. If the determination is yes, method 300 proceeds from 324 to 326. If, however, the determination is no, method 300 proceeds from 324 to 328.

At 326, the activated cart adjustment can be applied to the local cart, for example, to calculate an updated total charge of the cart. From 326, method 300 proceeds to 328.

At 328, a UI component for the cart adjustment can be instantiated, for example, for displaying or otherwise presenting the cart adjustment to the user. From 328, method 300 proceeds to 330.

At 330, the UI component for the cart adjustment can be added to the checkout view of the partner application, thus presenting the cart adjustment to the user. From 330, method 300 goes back to 322.

Figure 4:
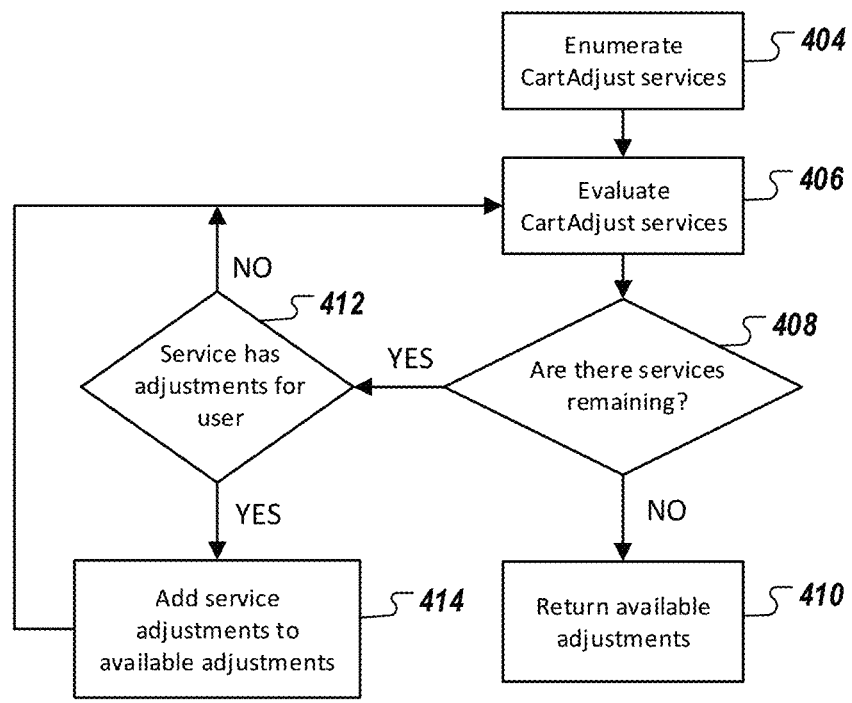
FIG. 4 is a flow chart of a method for identifying cart adjustments according to an implementation.

FIG. 4 is a flow chart illustrating an example method 400 for identifying cart adjustments according to an implementation. Method 400 can be an example implementation of 312 of method 300 of FIG. 3 and/or 706 of method 700 of FIG. 7. For clarity of presentation, the description that follows generally describes method 400 in the context of FIGS. 1A, 1B, 2, 3, and 5-8. For example, some or all of the example method can be performed by the CartAdjust service 210 of FIG. 2. However, it will be understood that method 400 may be performed, for example, by any other suitable system, environment, software, and hardware, or a combination of systems, environments, software, and hardware as appropriate. In some implementations, various steps of method 400 can be run in parallel, in combination, in loops, and/or in any order.

At 404, one or more services provided by a CartAdjust system (e.g., the CartAdjust system 110 of FIG. 1A) can be enumerated. The services can include, for example, loyalty service 131, deep link commerce service 133, promotion services 135*a-c*, cart adjustment service 137, fingerprint service 139, and/or any other services related to cart adjustment. From 404, method 400 proceeds to 406.

At 406, each of the services is evaluated to determine one or more available cart adjustments for the user. In some implementations, the availability of the cart adjustments are determined based on partner enrollment and/or user enrollment in product services that utilize CartAdjust technology. For example, for a given service, it can be determined whether the particular partner ecommerce vendor has enrolled with the given service. If the partner ecommerce vendor has enrolled in the service, it can be determined whether the user has enrolled with the service. In some implementations, cart adjustment provided by the given service may only be available if both the user and the partner service are registered with the given service 230. In some implementations, the cart adjustment system can provide the cart adjustments to a user who is registered with the service through the cart adjustment system, regardless of whether the partner service is registered or not. For example, the user can use stored values issued by the cart adjustment system rather than from the partner ecommerce vendors for cart adjustments. In some implementations, the user status or information can be checked to determine whether, for example, a type (e.g., a credit, a debit, a deduction, an earning points, etc.), an amount, or other parameter(s) of the adjustment can be applied to the cart. For example, whether the user has a balance or credits available in his/her account that can be applied to the shopping cart, whether the user is located in a region where a particular promotion is occurring, and/or other attributes of the user that can be evaluated to determine the cart adjustment. In some implementations, the cart adjustment can be based on the policies or rules stipulated by a partner ecommerce vendor and/or the cart adjustment system. From 406, method 400 proceeds to 408.

At 408, whether there is any service remaining (i.e., has not been evaluated) can be determined. If the determination is no, method 400 proceeds from 408 to 410. If, however, there is a service remaining, method 400 proceeds from 408 to 412.

At 412, whether the remaining service has an adjustment(s) for the user can be determined. The adjustments can be determined, for example, based on whether a particular service is applicable to the particular user (e.g., whether the user is a member/subscriber of a loyalty service, whether the user qualifies the deep link commerce service by downloading or accessing the partner application through another partner application, etc.). If yes, method 400 proceeds from 412 to 414. If no, method 400 goes back to 406.

At 414, the available adjustment is added to the set of available cart adjustments for the user. From 414, method 400 proceeds to 410.

At 410, one or more available cart adjustments can be output or otherwise returned. From 410, method 400 stops.

Figure 5:
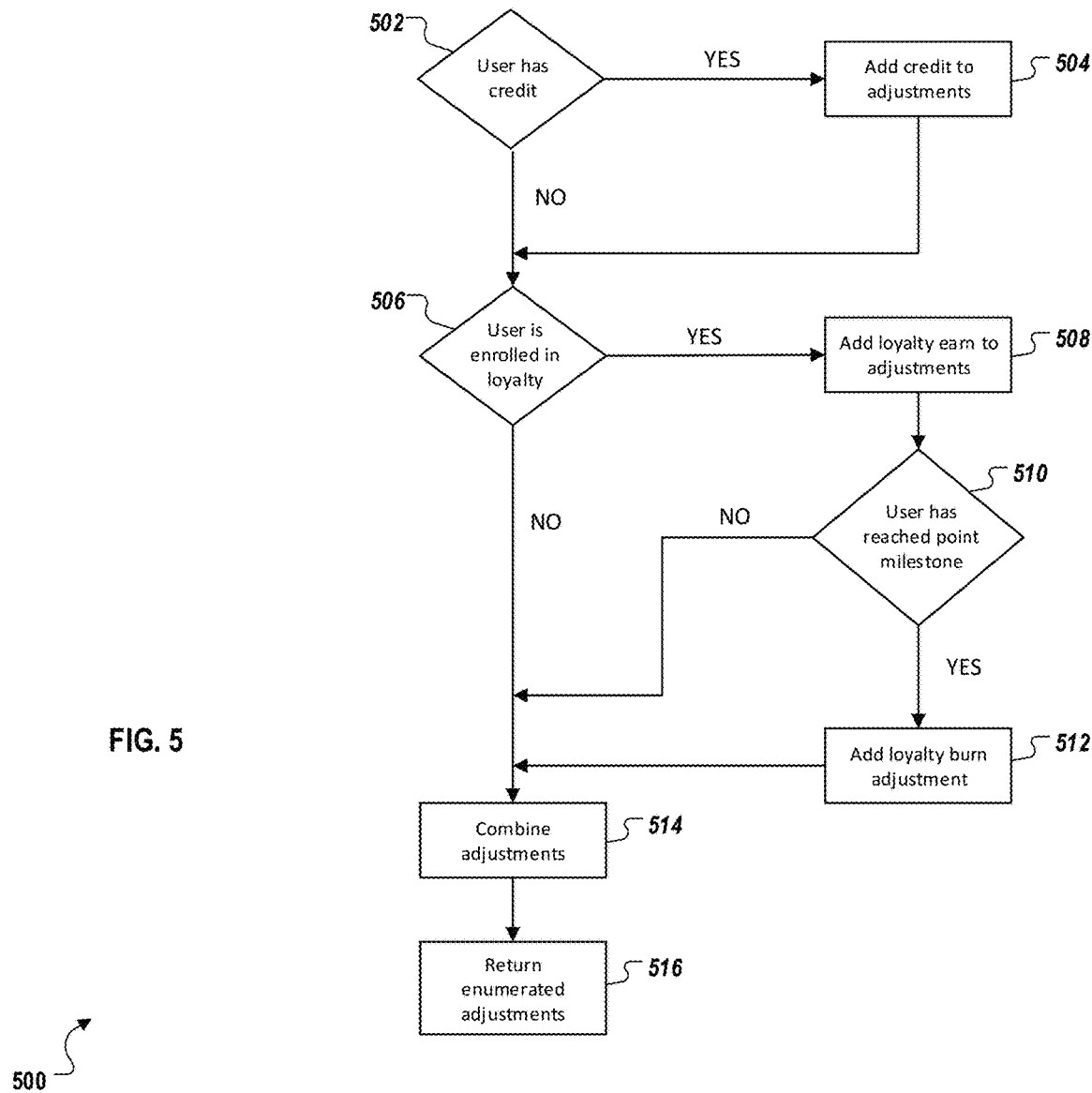
FIG. 5 is a flow chart of a specific example of the method for identifying cart adjustments of FIG. 4 according to an implementation.

FIG. 5 is a flow chart of a specific example 500 of the method 400 for identifying cart adjustments of FIG. 4 according to an implementation. For clarity of presentation, the description that follows generally describes method 500 in the context of FIGS. 1A, 1B, 2-4, and 6-8. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, and/or in any order.

At 502, whether a user has credit applicable to a current shopping cart of the partner application can be determined. In some implementations, the credit can be a credit of a stored value of the user. The stored value can be issued, for example, by the cart adjustment system itself (e.g., in some instances, issued without requiring enrollment), a partner ecommerce vendor, and/or a service (e.g., loyalty service 131, deep link commerce service 133, promotion services 135a-c, fingerprint service 139, etc.) related to the cart adjustments. If yes, method 500 proceeds from 502 to 504. If no, method 500 proceeds to 506.

At 504, the credit can be identified as a cart adjustment and added to the set of available cart adjustments for the user. From 504, method 500 proceeds to 506.

At 506, whether the user is enrolled in a loyalty service can be determined. If yes, method 500 proceeds from 506 to 508. If no, method 500 proceeds to 514.

At 508, a loyalty earn of the user based on the current shopping cart can be determined. The loyalty earn (e.g., in terms of points, mileages, and/or other metrics) can be identified as a cart adjustment and added to the set of available cart adjustments for the user. From 508, method 500 proceeds to 510.

At 510, whether the user has reached a point milestone of the loyal service can be determined. If yes, method 500 proceeds from 510 to 512. If no, method 500 proceeds to 514.

At 512, the points of the user can be, for example, converted to the currency of the shopping cart and thus the loyalty burn (i.e., exchange/redemption of the loyalty points/credit) can be identified as a cart adjustment and added to the set of available cart adjustments for the user. From 512, method 500 proceeds to 514.

At 514, one or more cart adjustments can be combined, for example, by converting and adding their monetary values together and/or selecting one of the monetary values determined based on the respective services. From 514, method 500 proceeds to 516.

At 516, the set of available cart adjustments can be enumerated and returned. After 516, method 500 stops.

Figure 6:
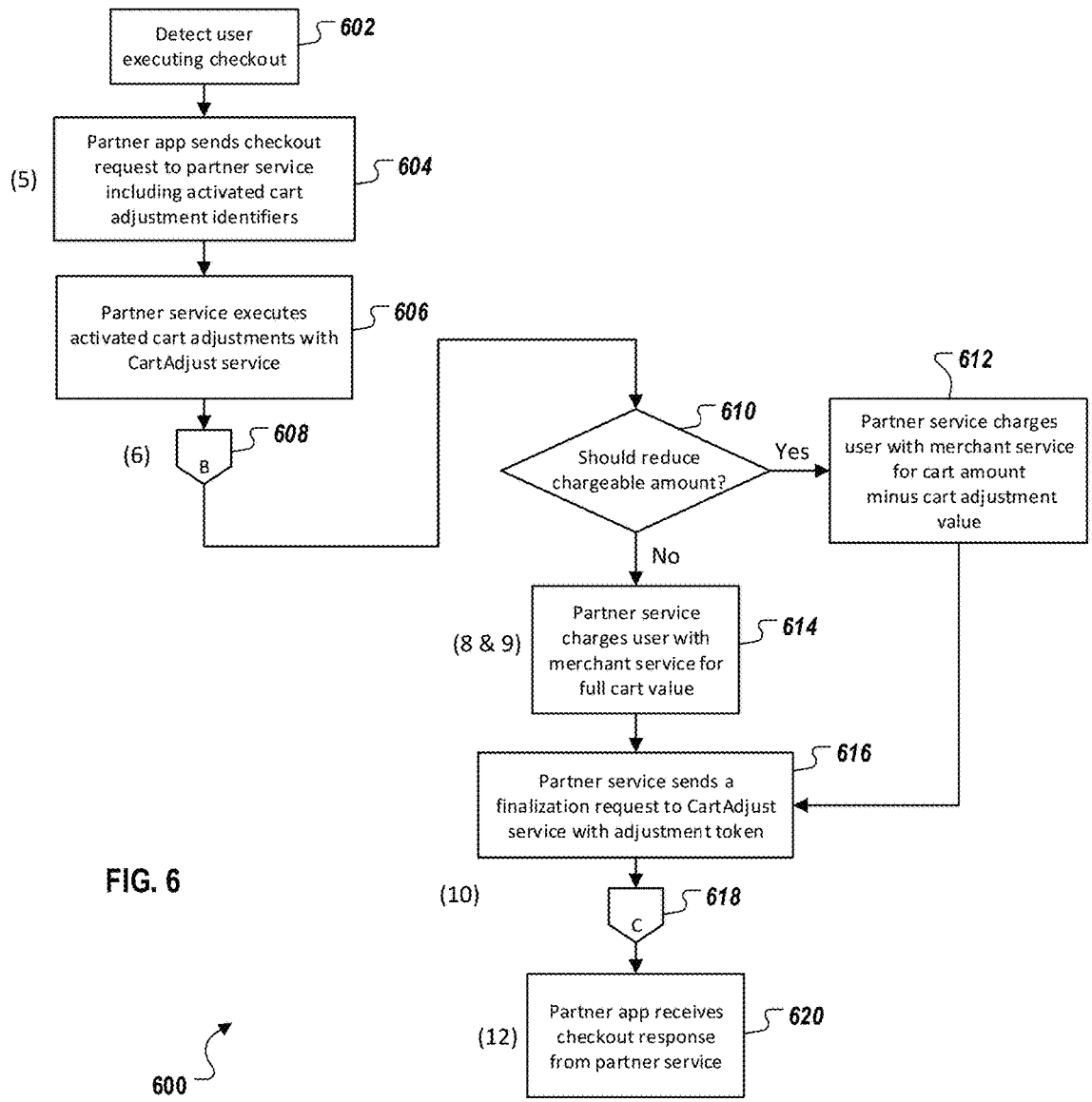
FIG. 6 is a flow chart of a method illustrating a checkout flow according to an implementation.

FIG. 6 is a flow chart of a method 600 illustrating a checkout flow according to an implementation. For clarity of presentation, the description that follows generally describes method 600 in the context of FIGS. 1A, 1B, 2-5, and 7-8. For example, some or all of the example method can be performed by the partner application 220 and the partner service 230 of FIG. 2. However, it will be understood that method 600 may be performed, for example, by any other suitable system, environment, software, and hardware, or a combination of systems, environments, software, and hardware as appropriate. In some implementations, various steps of method 600 can be run in parallel, in combination, in loops, and/or in any order.

At 602, a user executing a checkout can be detected, for example, by the partner application receiving an indication of the user clicking or otherwise activating the checkout button (e.g., the checkout button 228 of FIG. 2). From 602, method 600 proceeds to 604.

At 604, a checkout request is sent, for example, by the partner application, to the partner service. The checkout request can include an identifier of a cart adjustment that indicates the cart adjustment is activated. In some instances, 604 can correspond to (5) of method 200 of FIG. 2. From 604, method 600 proceeds to 606.

At 606, the partner service can interact with the CartAdjust service for executing the activated cart adjustment, for example, by sending to the CartAdjust service the checkout request including the identifier of the activated cart adjustment. From 606, method 600 proceeds to 608.

At 608, the activated cart adjustment is executed. Example techniques for executing the activated cart adjustments are described in greater detail below with respect to FIG. 7. In some instances, 608 can correspond to (6) of method 200 of FIG. 2. From 608, method 600 proceeds to 610.

At 610, whether the charge of the cart should be reduced can be determined, for example, based on the activated cart adjustment. For instance, if the activated cart adjustment includes a charge reduction (e.g., in the form of credit, coupon, etc.) applicable to the cart of the user, then the charge of the cart can be reduced. As such, method 600 proceeds from 610 to 612. If the charge of the cart cannot be reduced, method 600 proceeds to 614.

At 612, a reduced cart total can be charged to the user. For example, the partner service can (e.g., interact with a partner payment gateway to) charge the user with merchant service for the original or full cart amount minus the reduction value specified by the activated cart adjustment. From 612, method 600 proceeds to 616.

At 614, a full cart value can be charged to the user. For example, the partner service can (e.g., interact with a partner payment gateway to) charge the user with merchant service for the original or full cart amount of the activated cart adjustment that does not include any charge reduction. From 614, method 600 proceeds to 616. In some instances, 612 and/or 616 can correspond to (8) and (9) of method 200 of FIG. 2.

At 616, the partner service can send to the CartAdjust service a request for finalizing the activated cart adjustment. From 616, method 600 proceeds to 618.

At 618, the activated cart adjustment is finalized. Example techniques for finalizing the activated cart adjustments are described in greater detail below with respect to FIG. 8. In some instances, 616 and/or 618 can correspond to (10) of method 200 of FIG. 2. From 618, method 600 proceeds to 620.

At 620, a checkout response can be received, for example, by the partner service from the CartAdjust service. In some instances, 620 can correspond to (12) of method 200 of FIG. 2. After 620, method 600 stops.

Figure 7:
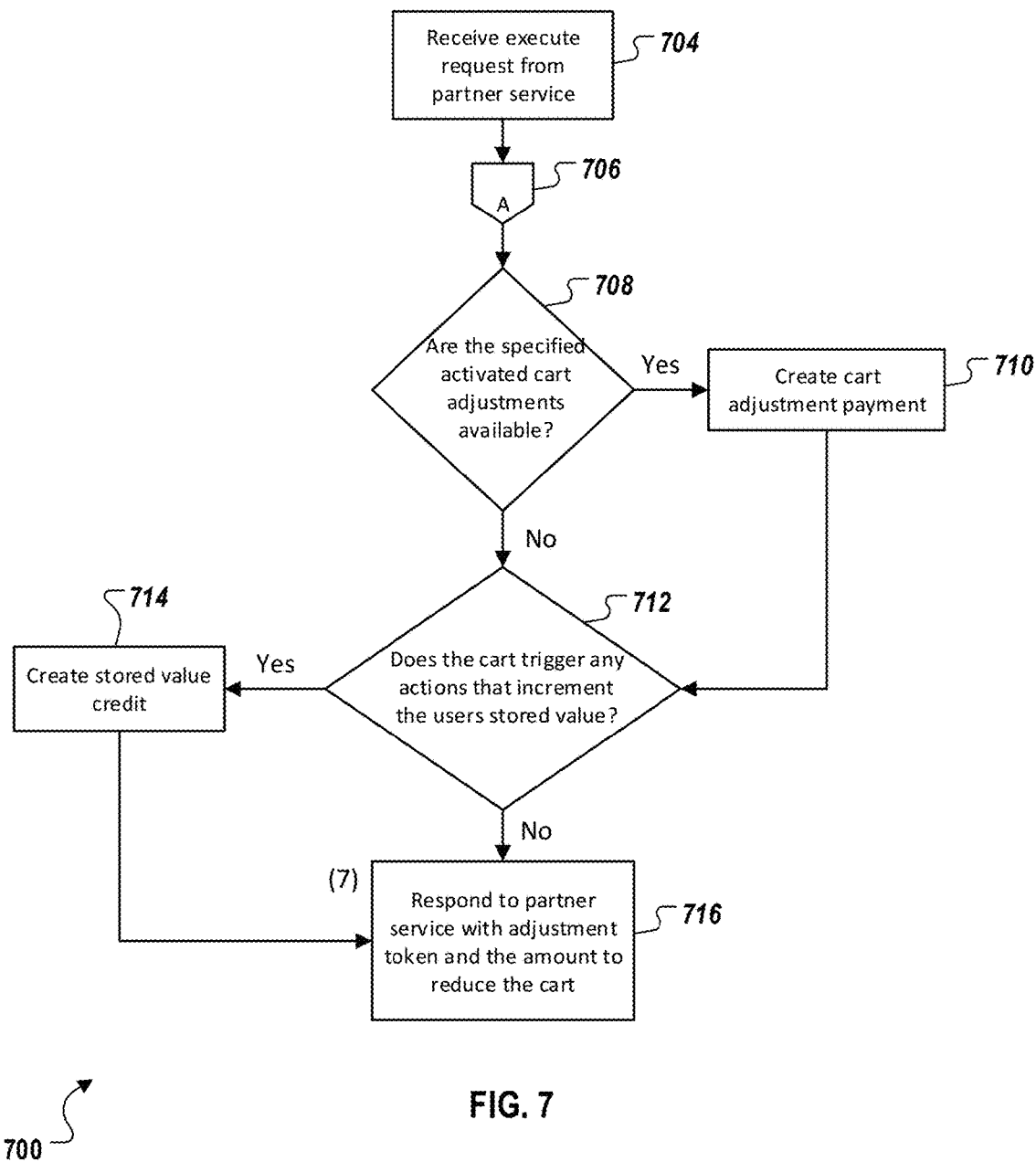
FIG. 7 is a flow chart of a method illustrating executing cart adjustments according to an implementation.

FIG. 7 is a flow chart of a method 700 illustrating executing cart adjustments according to an implementation. Method 700 can be an example implementation of 608 of method 600 of FIG. 6. For clarity of presentation, the description that follows generally describes method 700 in the context of FIGS. 1A, 1B, 2-6, and 8. For example, some or all of the example method can be performed by the CartAdjust service 210 of FIG. 2. However, it will be understood that method 700 may be performed, for example, by any other suitable system, environment, software, and hardware, or a combination of systems, environments, software, and hardware as appropriate. In some implementations, various steps of method 700 can be run in parallel, in combination, in loops, and/or in any order.

At 704, a request for executing the cart adjustment is received from the partner service, for example, by the CartAdjust service. From 704, method 700 proceeds to 706.

At 706, a set of available cart adjustments can be identified, for example, based on the example techniques described with respect to method 400 of FIG. 4. From 706, method 700 proceeds to 708.

At 708, whether the specified activated cart adjustment is available can be determined, for example, by determining whether the specified activated cart adjustment is included in the set of available cart adjustments identified at 706. If the specified activated cart adjustment is available, method 700 proceeds from 708 to 710. If no, method 700 proceeds to 712.

At 710, a cart adjustment payment can be created, for example, based on the specified activated cart adjustment. In some implementations, the cart adjustment payment can be created by deducting credit or any other payment reduction value specified in the activated cart adjustment from the full cart value. From 706, method 700 proceeds to 708.

At 712, whether the cart triggers any actions that increment the user's stored value can be determined. In some implementations, the partner ecommerce vendor and/or the cart adjustment system can define policy/rules for the user's stored value. An example rule can be, earn $5 if a customer spends over $500 or purchases a particular product. The cart can be evaluated against the policy/rule to see if the user is eligible for any increment of the stored value. If the determination is yes, method 700 proceeds from 712 to 714. If the determination is no, method 700 proceeds to 716.

At 714, the stored value credit can be created. As such, an additional stored value is generated, thus increasing the user's overall account balance in the currency of the stored value. From 714, method 700 proceeds to 716.

At 716, a cart adjustment token identifying the activated adjustment to the cart of the user and the payment adjustment (e.g., the amount to be deducted from the full cart value or the updated cart value after applying the activated adjustment), determined based on the activated adjustment to the cart of the user, can be sent to the partner service server. After 716, method 700 stops.

Figure 8:
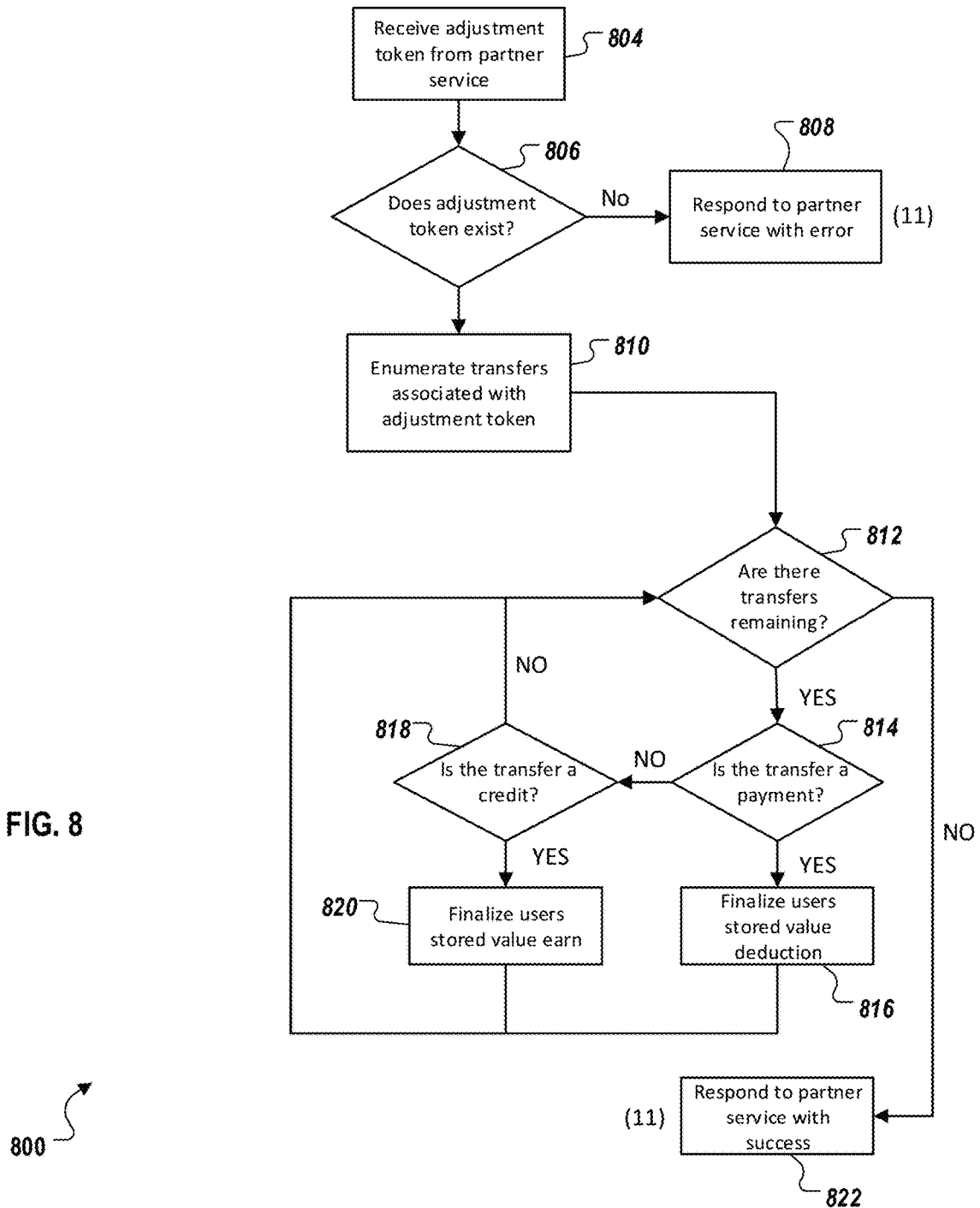
FIG. 8 is a flow chart of a method of finalizing cart adjustments according to an implementation.

FIG. 8 is a flow chart of a method 800 of finalizing cart adjustments according to an implementation. Method 800 can be an example implementation of 618 of method 600 of FIG. 6. For clarity of presentation, the description that follows generally describes method 800 in the context of FIGS. 1A, 1B, and 2-7. For example, some or all of the example method can be performed by the CartAdjust service 210 of FIG. 2. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, and/or in any order.

At 804, an AC token is received from the partner service. The cart adjustment token identifies an executed cart adjustment to be finalized. From 804, method 800 proceeds to 806.

At 806, whether the AC token exists can be determined. In some implementations, the CartAdjust service can store a list of AC tokens that have been executed (e.g., according to example techniques described with respect to method 700 of FIG. 7). By checking whether the received AC token exists in the list of executed AC tokens, the CartAdjust service can determine whether the received AC token is valid or not. If the received AC token does not exist, method 800 proceeds from 806 to 808. If the received AC token does exist, method 800 proceeds from 806 to 810.

At 808, an error message can be sent to the partner service reporting that the requested finalization of the cart adjustment is not valid. In some instances, 808 can correspond to an example implementation of (11) of method 200 of FIG. 2. After 808, method 800 stops.

At 810, one or more transfers associated with the cart adjustment token can be enumerated. A transfer allows the stored value to be exchanged between a source and a destination (e.g., one or more stored value accounts, partner service account, partner payment account, banking account, etc.). The transfer can be a payment (e.g., a redemption) of the stored value, a credit (e.g., a gain or increase) of the stored value, or in another form. After 810, method 800 proceeds to 812.

At 812, it is determined whether there remains any transfer associated with the received cart adjustment token that has not been checked. If yes, method 800 proceeds from 812 to 814 to. If no, method 800 proceeds from 812 to 822.

Note, in the case that it is determined that no transfer remains that is associated with the received cart adjustment token that has not been checked, the payment can be created, for example, based on the specified activated cart adjustment. In some implementations, the cart adjustment payment can be created by deducting credit or any other payment reduction value specified in the activated cart adjustment from the full cart value. From 806, method 800 proceeds to 808.

At 814, whether the transfer is a payment can be determined. If yes, method 800 proceeds from 814 to 816. If no, method 800 proceeds from 814 to 818.

At 816, the user's stored value deduction can be finalized. From 816, method 800 goes back to 812.

At 818, whether the transfer is a credit can be determined. If yes, method 800 proceeds from 818 to 820. If no, method 800 goes back to 812.

At 820, the user's stored value earn can be finalized. From 820, method 800 goes back to 812.

At 822, a success response can be sent to the partner service when all the transfers associated with the AC token have been assessed. The response can indicate that the finalization of the received AC token has been successfully performed. After 822, method 800 stops.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface including, but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
    sending, to a cart adjustment computing system and from a partner application executing on a client computing device remote from the cart adjustment computing system, a cart adjustment request associated with a checkout operation performed on the partner application;
    receiving, from the cart adjustment computing system and at the partner application, one or more available adjustments applicable to a cart of a user using the partner application for checkout, wherein the one or more available adjustments include a deep link to direct the user from the partner application to another software application to execute on the client computing device, and wherein the deep link utilizes fingerprinting to identify the user to the partner application and to the other software application;
    accessing the other software application following selection of the deep link by the user;
    persisting a user context between the partner application and the other software application;
    receiving, at the partner application and from the other software application, one or more other available adjustments applicable to the cart of the user;
    sending, from the partner application and to the cart adjustment computing system, an activated adjustment selected from the one or more available adjustments and the one or more other available adjustments; and
    receiving, from the cart adjustment computing system and at the partner application, a cart state following application of the activated adjustment to the cart of the user.

2. The method of claim 1, further comprising:
    determining, using the cart adjustment computing system, whether one or more services are applicable to the cart of the user; and
    determining, using the cart adjustment computing system, whether one or more adjustments are available based on the one or more services.

3. The method of claim 2, wherein determining the one or more adjustments are available based on the one or more services comprises determining whether:
    the user has a credit applicable to the cart; or
    the user is enrolled in a loyalty service that is to be affected by the cart.

4. The method of claim 1, further comprising:
    receiving, at the cart adjustment computing system and from the partner application, the activated adjustment; and sending, from the cart adjustment computing system and to the partner application, a cart state after applying the activated adjustment.

5. The method of claim 1, further comprising:
receiving, at the cart adjustment computing system and from a partner service server, an execution request to execute an activated adjustment;
in response to receiving the execution request:
  determining a payment adjustment based on the activated adjustment to the cart of the user; and
  determining whether the cart triggers an action that affects a stored value of the user;
sending, from the cart adjustment computing system and to the partner service server, a cart adjustment token as a receipt identifying that the activated adjustment to the cart of the user has been selected and executed for checkout purposes and a payment adjustment determined based on the activated adjustment to the cart of the user;
receiving, at the cart adjustment computing system and from the partner service server, a finalization request for finalizing the activated adjustment; and
finalizing, using the cart adjustment computing system, the activated adjustment to the cart of the user using the cart adjustment token to identify the finalized activated adjustment.

6. The method of claim 5, wherein finalizing, using the cart adjustment computing system, the activated adjustment to the cart of the user comprises:
updating account information of the user based on the execution of the activated adjustment to the cart of the user; and
sending, to the partner service server, a confirmation indicating a success or failure of the execution of the activated adjustment to the cart of the user.

7. The method of claim 6, wherein updating account information of the user based on the execution of the activated adjustment to the cart of the user comprises:
determining a transfer associated with the cart adjustment token; and
updating a stored value of the user based on the transfer.

8. A non-transitory, computer-readable medium storing computer-readable instructions for providing contextual ecommerce shopping cart adjustments, the instructions executable by a computer and comprising:
sending, to a cart adjustment computing system and from a partner application executing on a client computing device remote from the cart adjustment computing system, a cart adjustment request associated with a checkout operation performed on the partner application;
receiving, from the cart adjustment computing system and at the partner application, one or more available adjustments applicable to a cart of a user using the partner application for checkout, wherein the one or more available adjustments include a deep link to direct the user from the partner application to another software application to execute on the client computing device, and wherein the deep link utilizes fingerprinting to identify the user to the partner application and to the other software application;
accessing the other software application following selection of the deep link by the user;
persisting a user context between the partner application and the other software application;
receiving, at the partner application and from the other software application, one or more other available adjustments applicable to the cart of the user;
sending, from the partner application and to the cart adjustment computing system, an activated adjustment selected from the one or more available adjustments and the one or more other available adjustments; and
receiving, from the cart adjustment computing system and at the partner application, a cart state following application of the activated adjustment to the cart of the user.

9. The non-transitory, computer-readable medium of claim 8, wherein the instructions further comprise:
determining, using the cart adjustment computing system, whether one or more services are applicable to the cart of the user; and
determining, using the cart adjustment computing system, whether one or more adjustments are available based on the one or more services.

10. The non-transitory, computer-readable medium of claim 9, wherein determining the one or more adjustments are available based on the one or more services comprises determining whether:
the user has a credit applicable to the cart; or
the user is enrolled in a loyalty service that is to be affected by the cart.

11. The non-transitory, computer-readable medium of claim 8, the instructions further comprise:
receiving, at the cart adjustment computing system and from the partner application, the activated adjustment; and
sending, from the cart adjustment computing system and to the partner application, a cart state after applying the activated adjustment.

12. The non-transitory, computer-readable medium of claim 8, wherein the instructions further comprise:
receiving, at the cart adjustment computing system and from a partner service server, an execution request to execute an activated adjustment;
in response to receiving the execution request:
  determining a payment adjustment based on the activated adjustment to the cart of the user; and
  determining whether the cart triggers an action that affects a stored value of the user;
sending, from the cart adjustment computing system and to the partner service server, a cart adjustment token as a receipt identifying that the activated adjustment to the cart of the user has been selected and executed for checkout purposes and a payment adjustment determined based on the activated adjustment to the cart of the user;
receiving, at the cart adjustment computing system and from the partner service server, a finalization request for finalizing the activated adjustment; and
finalizing, using the cart adjustment computing system, the activated adjustment to the cart of the user using the cart adjustment token to identify the finalized activated adjustment.

13. The non-transitory, computer-readable medium of claim 12, wherein finalizing, using the cart adjustment computing system, the activated adjustment to the cart of the user comprises:
updating account information of the user based on the execution of the activated adjustment to the cart of the user; and
sending, to the partner service server, a confirmation indicating a success or failure of the execution of the activated adjustment to the cart of the user.

14. The non-transitory, computer-readable medium of claim 13, wherein updating account information of the user based on the execution of the activated adjustment to the cart of the user comprises:
  determining a transfer associated with the cart adjustment token; and
  updating a stored value of the user based on the transfer.

15. A system, comprising:
  a memory;
  at least one hardware processor interoperably coupled with the memory and configured to:
    send, to a cart adjustment computing system and from a partner application executing on a client computing device remote from the cart adjustment computing system, a cart adjustment request associated with a checkout operation performed on the partner application;
    receive, from the cart adjustment computing system and at the partner application, one or more available adjustments applicable to a cart of a user using the partner application for checkout, wherein the one or more available adjustments include a deep link to direct the user from the partner application to another software application to execute on the client computing device, and wherein the deep link utilizes fingerprinting to identify the user to the partner application and to the other software application;
    access the other software application following selection of the deep link by the user;
    persist a user context between the partner application and the other software application;
    receive, at the partner application and from the other software application, one or more other available adjustments applicable to the cart of the user;
    send, from the partner application and to the cart adjustment computing system, an activated adjustment selected from the one or more available adjustments and the one or more other available adjustments; and
    receive, from the cart adjustment computing system and at the partner application, a cart state following application of the activated adjustment to the cart of the user.

16. The system of claim 15, wherein the processor is further configured to:
  determine, using the cart adjustment computing system, whether one or more services are applicable to the cart of the user; and
  determine, using the cart adjustment computing system, whether one or more adjustments are available based on the one or more services.

17. The system of claim 16, wherein determining the one or more adjustments are available based on the one or more services comprises determining whether:
  the user has a credit applicable to the cart; or
  the user is enrolled in a loyalty service that is to be affected by the cart.

18. The system of claim 15, wherein the processor is further configured to:
  receive, at the cart adjustment computing system and from the partner application, the activated adjustment; and
  send, from the cart adjustment computing system and to the partner application, a cart state after applying the activated adjustment.

19. The system of claim 15, wherein the processor is further configured to:
  receive, at the cart adjustment computing system and from a partner service server, an execution request to execute an activated adjustment;
  in response to receiving the execution request:
    determine a payment adjustment based on the activated adjustment to the cart of the user; and
    determine whether the cart triggers an action that affects a stored value of the user;
  send, from the cart adjustment computing system and to the partner service server, a cart adjustment token as a receipt identifying that the activated adjustment to the cart of the user has been selected and executed for checkout purposes and a payment adjustment determined based on the activated adjustment to the cart of the user;
  receive, at the cart adjustment computing system and from the partner service server, a finalization request for finalizing the activated adjustment; and
  finalize, using the cart adjustment computing system, the activated adjustment to the cart of the user using the cart adjustment token to identify the finalized activated adjustment.

20. The system of claim 19, wherein finalizing, using the cart adjustment computing system, the activated adjustment to the cart of the user comprises:
  updating account information of the user based on the execution of the activated adjustment to the cart of the user; and
  sending, to the partner service server, a confirmation indicating a success or failure of the execution of the activated adjustment to the cart of the user.

* * * * *